No. 709,562. Patented Sept. 23, 1902.
M. G. SWAN & E. H. RICHARDSON.
MACHINE FOR BRUSHING AND CLEANING FRUIT, PART OF WHICH IS APPLICABLE TO FRUIT GRADERS.
(Application filed Feb. 9, 1901.)
(No Model.) 3 Sheets—Sheet 1.
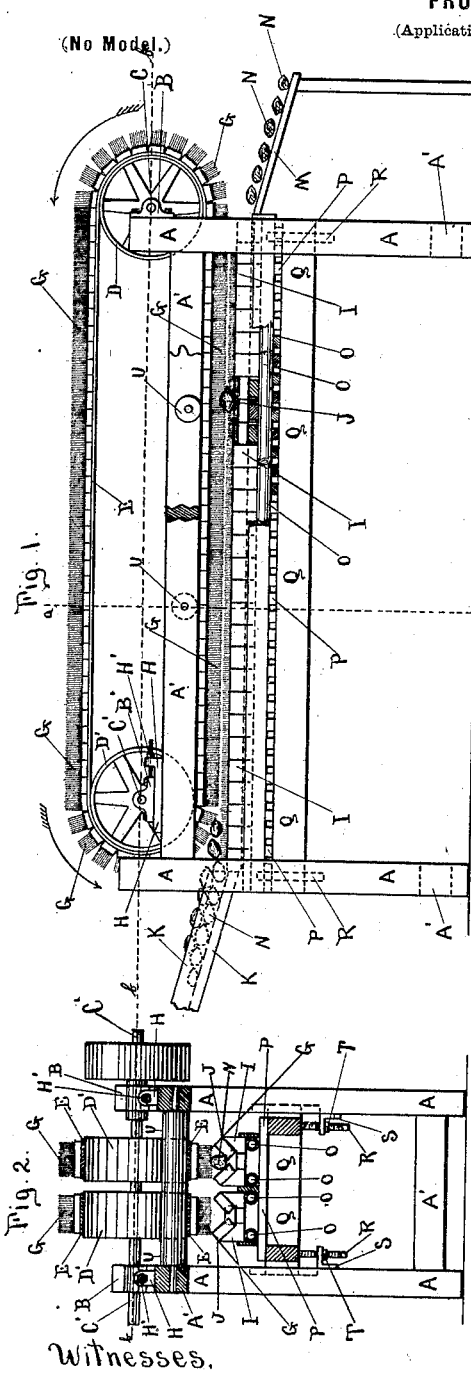
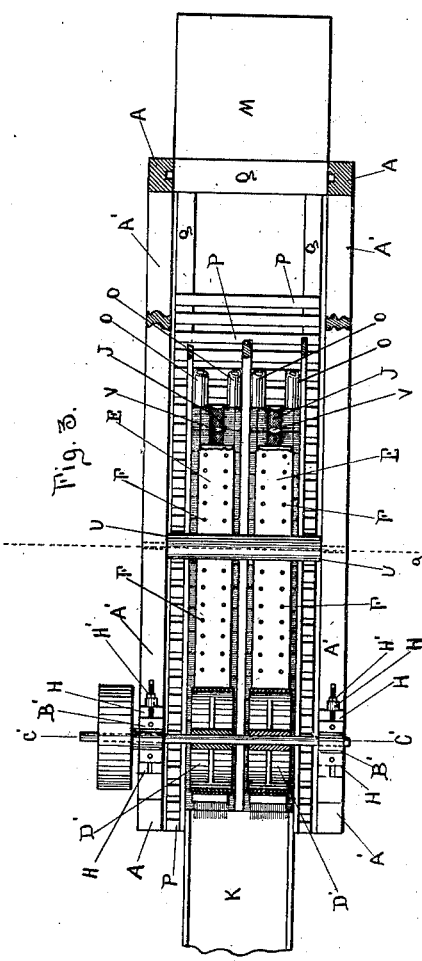
Witnesses.
Chas. Herrmann, Jr.
Chas. D. Robbins.
Inventors.
Morton Greely Swan
By Earl Holmes Richardson
St. John Day.
Attorney.
THE NORRIS PETERS CO., PHOTO-LITHO., WASHINGTON, D. C.

No. 709,562. Patented Sept. 23, 1902.
M. G. SWAN & E. H. RICHARDSON.
MACHINE FOR BRUSHING AND CLEANING FRUIT, PART OF WHICH IS APPLICABLE TO FRUIT GRADERS.
(Application filed Feb. 9, 1901.)
(No Model.) 3 Sheets—Sheet 2.
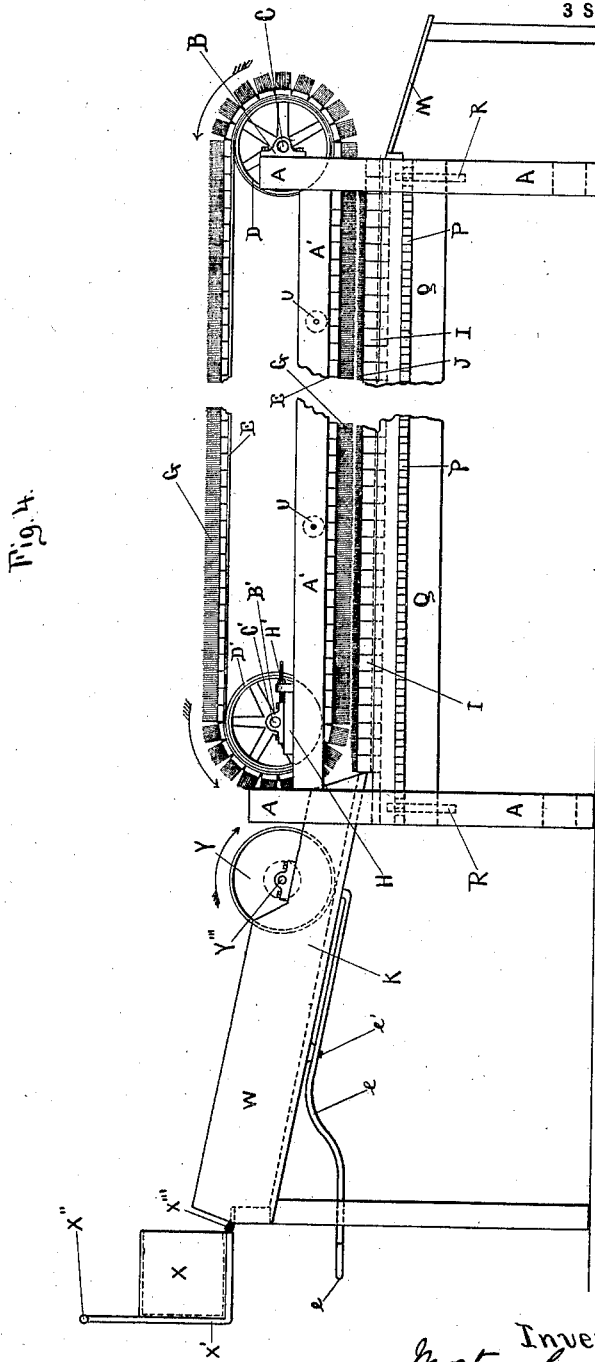
Witnesses.
Chas. Herrmann, Jr.
Chas. D. Robbins.
Inventors.
Morton Greely Swan
Earl Holmes Richardson
By St. John Day
Attorney.

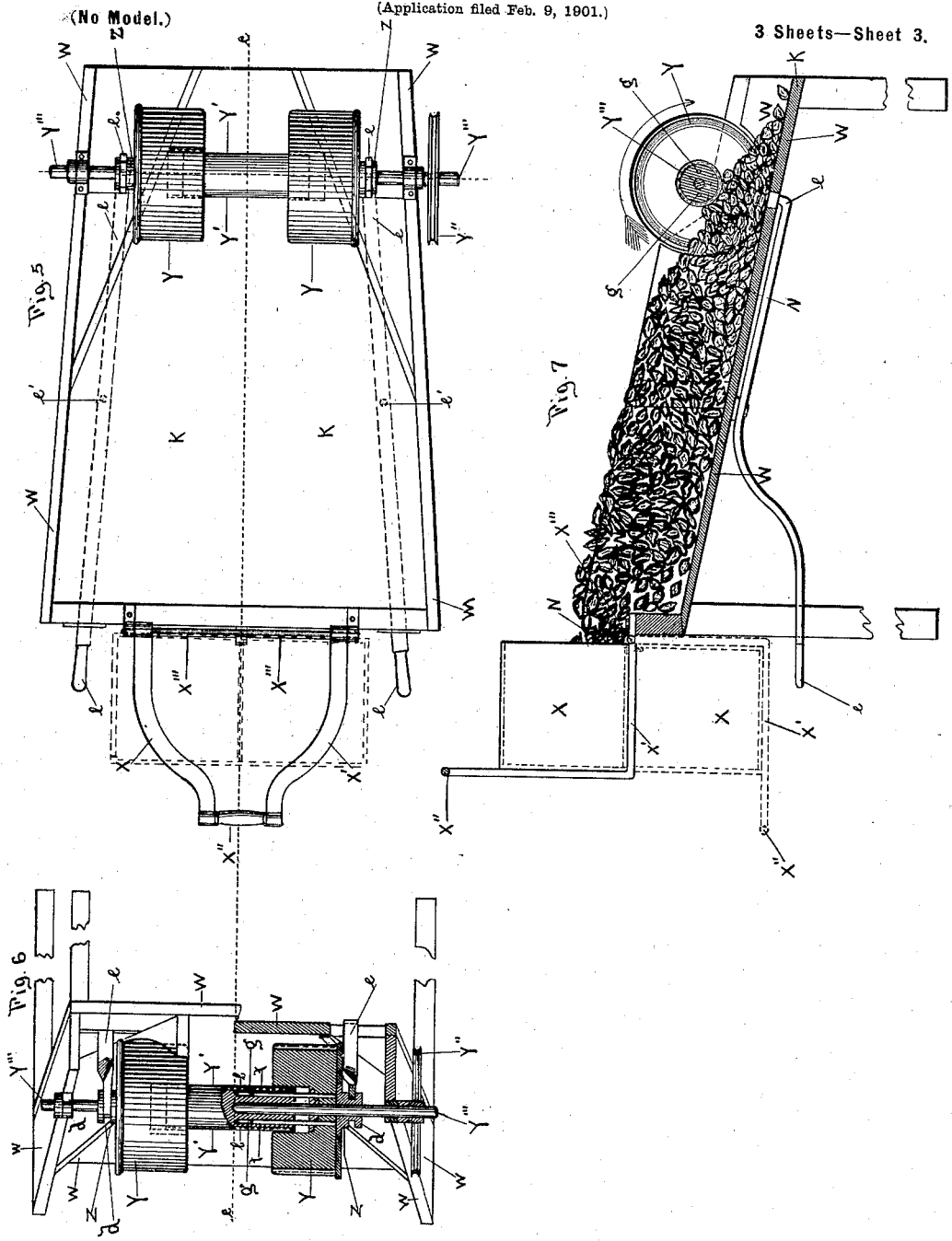

UNITED STATES PATENT OFFICE.

MORTON GREELY SWAN AND EARL HOLMES RICHARDSON, OF NORTH ONTARIO, CALIFORNIA; SAID SWAN ASSIGNOR TO FRANK JAMES KIMBALL, OF LOS ANGELES, CALIFORNIA.

MACHINE FOR BRUSHING AND CLEANING FRUIT, PART OF WHICH IS APPLICABLE TO FRUIT-GRADERS.

SPECIFICATION forming part of Letters Patent No. 709,562, dated September 23, 1902.

Application filed February 9, 1901. Serial No. 46,733. (No model.)

*To all whom it may concern:*

Be it known that we, MORTON GREELY SWAN and EARL HOLMES RICHARDSON, of North Ontario, in the county of San Bernardino, in the State of California, have invented certain new and useful Improved Machines for Brushing and Cleaning Fruit, part of which is Applicable to Fruit-Graders and other Uses, of which the following is a full, clear, and exact description or specification, reference being had to the annexed sheets of drawings and to the letters marked thereon.

Our said invention, which relates to machines for brushing and cleaning fruit, such as oranges and lemons or citrus fruit generally, is also applicable for brushing and cleaning other kinds of fruit after the fruit is picked from the trees whereon said fruit grows; and the principal object of our invention is to remove scale, smut, and other foreign or parasitic matter which accumulates or collects on such fruit while growing upon the trees, effecting the removal of such scale, smut, or other matter without injury to the fruit while being so treated.

In the mechanism constituting our invention the fruit is fed into the cleaning-machine from a hopper by a feed device of special construction, which allows the passage of the fruit to the cleaning mechanism in regulated quantity without pressing or injuring the same while passing through the feeder, and after the fruit has been brushed or cleaned it is discharged in the cleaned state onto a delivery-table for being collected into boxes or other receptacles for marketing or storage purposes.

The cleaning or brushing part of the machine consists of one or more endless belts running in parallel and each carrying brushes fixed to the outer face thereof and having a series of non-traversing brushes beneath, which non-traversing brushes are put together in such manner as to constitute a trough-like brush extending practically throughout the entire length of the cleaning mechanism, so that the fruit in being cleansed not only is caused to be carried along the trough-shaped brushes, but is also simultaneously rotated and brushed therein by the movement of the fruit between the non-traveling and traveling brushes.

In order not to injure the fruit during the time it is passing through the cleaning or brushing mechanism, the non-traveling brushes are carried upon flexible or elastic tubes or equivalent springs, which may be more or less inflated with air and which tubes yield to the passage through the machine of the citrus or other fruit of different sizes, as hereinafter described.

Besides the feeding part of the device or mechanism constituting this invention being applicable for feeding fruit in regulated quantity to the brushing or cleaning part of the mechanism the said feeding device may be used in connection with or for feeding fruit to machines other than brushing or cleaning machines. As an instance of this we herein state that we have used such feeding device with considerable success for feeding citrus fruit to machines of the class commonly known as "graders"—that is to say, machines which separate the fruit into a series of different sizes and deliver such graded or sized fruit into boxes or other receptacles.

On the annexed drawings, Figure 1 is a side elevation, partly in section, of the brushing or cleaning part of the mechanism constituting our invention. Fig. 2 is a transverse section of the same on the line *a a*, Figs. 1 and 3. Fig. 3 is a horizontal section of the same on the line *b b*, Figs. 1 and 2. Fig. 4 is a side elevation, on a slightly-smaller scale than Figs. 1, 2, and 3, of the brushing and cleaning mechanism, with the feeding device attached thereto shown in outline. Fig. 5 is a plan, on a larger scale, of the feeding device. Fig. 6 is in part a front elevation and in part a transverse vertical section of the said feeding device. Fig. 7 is a longitudinal section on the line *c c*, Figs. 5 and 6, and on the same scale as Figs. 5 and 6, showing some parts in elevation of the said feed device.

In Figs. 1, 2, 3, and 4 the main framing of the machine consists, preferably, of standards and bearers of lumber or timber (marked A and A', respectively) united together so as to form a rectangular framing, as shown in said figures. On the upper longitudinal bearers A' there are mounted the bearings B and B', respectively, for carrying the shafts C C', upon which the belt-pulleys D and D' are carried. Upon each pair of pulleys D and D' an endless belt E is carried, as shown at Figs. 1 to 4. Upon the outer face of each of the belts E E a series of brushes G is fixed by screws F, the heads of some of which are shown in Fig. 3 and each pair of which screws are passed down through holes in the belts E E and into the wood or other material constituting the blocks whereinto the bristles of the brushes G G of the several blocks of brushes are secured. By means of this part of the mechanism a continuous horizontal travel of the belt or brushes in the direction of the arrows (shown at Figs. 1 and 4) is obtained. For the purpose of tightening or loosening from time to time the endless belts E E, carrying the brushes G G, the bearing-blocks B' are mounted upon an adjustable bed H, Figs. 1, 2, 3, and 4, each provided with a set-screw and check-nut H' for adjusting and fixing the same as from time to time required.

Beneath each endless belt E, carrying the brushes G, there are arranged longitudinally troughs I I, which troughs I I are lined with brushes J J in trough-like form, as shown more particularly at Figs. 1, 2, 3, and 4, and thus there is formed between the lower part of the traveling belt and the upper surface of the troughs I I an open passage lined or covered with the brushes G G and J J, respectively, constituting the top and bottom thereof. In this manner as the endless belts E E, with the traveling brushes G G attached to them, move horizontally in the direction of the arrows the fruit fed into the machines from the fruit-table K, constituting the bottom of the feed-hopper W, is drawn in between the upper and lower brushes G G and J J, respectively, and by the traveling action of the upper brushes G G caused to be propelled between the two lines of brushes G G and J J, the traveling action of the upper brushes G G causing the fruit to be rotated in the course of its passage through the machine between the upper and lower brushes and ultimately to be discharged from the machine as brushed and cleaned fruit by passing onto the discharge table or platform M.

In Figs. 1 and 2 lemons (marked N) are shown as being fed into the feeding end of the machine and as being discharged cleaned at the opposite end of the machine.

As the fruit to be brushed and cleaned in the machine constituting our invention varies considerably in size, it is necessary that the space between the brushes G G and J J should not only be capable of adjustment, but also of yielding elastically to fruit of different sizes passing through the machine, and for this purpose the lower brushes J J are mounted upon tubes O O, of india-rubber or other suitable material, which rest upon the slats P of a rectangular framing Q, which is supported upon the top of four screws R R R R, which pass through screwed holes in angle-iron brackets S, fixed to the uprights A of the framing, as shown at Fig. 2, and provided with check-nuts T at the under side of the angle-iron brackets. By turning the screws R R R in either the right or left hand direction the framing Q, the slats P P, the elastic tubes O O, and the troughs and brushes I I and J J, respectively, are raised or lowered to any required distance from the upper brushes G G of the traveling belts E E, so as to accommodate any size of fruit required to be passed through the brushing and cleaning machine, and the elastic tubes O O O O, upon which the under brushes and their troughs I I and J J, respectively, are carried, permit the yielding of the under brushes when fruit of unequal sizes is passing through the machine.

For the purpose of maintaining the under part of the endless belt E E as practically horizontal as possible idlers U U are carried transversely between the frame-bars A' A', against which the passage of the fruit through the machine causes the upper faces of the endless belt to be pressed as the machine is in operation.

It is to be understood that while we have in Figs. 1, 2, 3, and 4 of the drawings shown two traveling belts E, with corresponding operating-pulleys D D and two pairs or sets of trough-brushes I I and J J, as well as two sets of tubes O O, for carrying the trough-brushes, yet we may construct our brushing and cleaning machine so as to consist of but one traveling belt E E, one set of traveling brushes G G, and one set of trough-brushes I I and J J, or we may construct our machine with any convenient larger number of pairs of traveling and stationary brushes with their operative and relative connecting parts. The brushes J J, constituting the trough of our machine, have formed at their central parts openings V V, as shown more especially at Fig. 3, for the purposes of allowing the scale, smut, dust, parasite, &c., brushed from the fruit to fall away from the brushes and which again falls out of the machine through the spaces formed by the slats P P P P.

The apparatus for feeding the fruit to be brushed or cleaned to the brushing or cleaning part of our mechanism hereinbefore described is for the purpose of perspicuity. (Shown enlarged at Figs. 5, 6, and 7.) This mechanism consists of an inclined hopper W, whereinto the fruit is discharged from a fruit packing-box. (Shown in end elevation at Fig. 7 and dotted in Fig. 5.) The fruit, which for convenience may be considered to be lemons N, is discharged from the front of the box X, as shown at Fig. 7. The box X is carried upon a hinged framing X', provided with a handle X'', by which the operator moves it from the lowest position (shown in dotted lines in Fig. 7) into the feeding position, (shown in full lines in the said Fig. 7,) the framing X' X' being carried or pivoted so as to move hingewise upon the rod X''', attached to the back of the hopper W, as shown at Figs. 5 and 7. When feeding the lemons N into the hopper W W, the attendant stands at the rear part of the hopper and with his hand clasping the handle X″ moves the box X to any suitable angle hingewise upon the rod or bar X‴, thereby causing the lemons N to fall out of the front of the box onto the hopper W at any required rate of speed or quantity. The lemons N as they pass down the inclined bottom of the hopper W W accumulate against the compound roller Y Y, having a central portion Y′ of less diameter than the ends thereof.

The object of constructing the compound feed-regulating roller Y Y and Y′ Y′ in the manner now to be described is to insure that the quantity of lemons or other fruit fed to the brushing or cleaning parts of the machine shall be regulated in quantity and rate as they are from time to time required, and for this purpose the two ends Y Y, respectively, of this compound feeding-roller are made movable longitudinally upon the cylindrical intermediate part Y′, so that the space between the movable ends Y Y and the under part of the intermediate portion Y′ Y′ of the compound feeding-roller can be varied according to the quantity of lemons or other fruit which it is from time to time desired to feed into the brushing and cleaning machine. The under portions Y Y of the compound feed-roller are formed at their outer centers with the caps Z, wherein grooves $d\,d$ are formed, with which the adjacent ends of two pivoted levers $e\,e$ engage, as shown at Figs. 5 and 6. The central hole at the inner faces of the ends Y Y is large enough to pass easily over the ends of the central cylindrical part Y′ Y′ of the feed-roller, and two rods $f\,f$ are fixed in each movable end Y, as shown in section at Fig. 6, which are long enough to pass into and slide in corresponding holes $g\,g$, formed in the central cylindrical part Y Y. From this arrangement and construction of the feed-roller Y Y and Y′ it follows that by the attendant operating the levers $e\,e$ so as to move either or both ends Y Y of the compound feed-roller nearer to or farther from each other a narrower or broader space, as the case may be, is left between the movable ends Y Y of this feed-roller and that thereby the space through which the lemons N or other fruit is fed to the cleaning or brushing machine is regulated, the fruit passing through the under part of this regulated space, as shown more especially at Fig. 7, wherein it is also shown that the ends Y Y of the feed-roller rotate almost in contact with the bottom of the hopper W W.

The lemons or other fruit N N N fed into the machine move or fall by gravitation toward the feed-roller and are moved by the effect of gravitation through the aforesaid spaces of the feed-roller, and for the purpose of insuring that the action of the feed-roller shall not injure the fruit by squeezing the fruit between any part of the feed-roller and the top of the bottom of the hopper W, as well as to insure that the fruit shall be fed by the action of gravity alone, the feed-roller Y Y′ is caused to rotate in the direction of the arrow shown at Fig. 7. The compound feed-roller is rotated by a belt passing over the pulley Y″, Figs. 5 and 6, fastened upon one end of the shaft Y‴, upon which the compound feed-roller is carried, and the feed-roller is preferably covered with felt, flannel, or other soft yielding or elastic material to prevent bruising the fruit.

Having now described and particularly ascertained the nature of our said invention and the best system, mode, or manner we are at present acquainted with for carrying the same into practical effect, we would observe in conclusion that what we consider to be novel and original, and therefore claim as the invention to be secured to us by Letters Patent, is as follows:

1. In a fruit cleaning and brushing machine, the combination of means for feeding the fruit by gravity in regulated quantity, a horizontal traveling, endless brush-surfaced belt, a trough-shaped bed beneath said belt, said bed comprising stationary brushes, and means for adjusting the distances between said brushes; an elastic or yielding support for said brushes; and a slatted or other open frame below said support; the openings between the brushes and in the bed permitting the escape of the impurities detached from the fruit, substantially as hereinbefore described.

2. The combination with a fruit-cleaning machine of a hopper having an inclined bottom to feed the fruit to the machine by gravity, a feed-regulator in said hopper, comprehending a roller having a reduced central section, two relatively large end sections in close proximity to the hopper-bottom, said end sections being adjustable toward and from each other, means for adjusting said end sections and means for driving said roller in a direction opposite to the direction of feed, substantially as hereinbefore described.

3. The combination with a fruit-cleaning machine of a hopper having an inclined bottom, a feed-regulator in said hopper, comprehending a transversely-arranged roller having two sections with an intervening space between the same, and adjustable toward and from each other, said sections being arranged in close proximity to the hopper-bottom, means for adjusting said roller-sections and means for rotating the same in a direction opposite to the direction of feed, substantially as hereinbefore described, and shown upon the annexed drawings.

In witness whereof we have hereunto set our hands and seals, this 8th day of December, A. D. 1900, in the presence of two subscribing witnesses.

MORTON GREELY SWAN. [L. S.]
  EARL HOLMES RICHARDSON. [L. S.]

Witnesses:
 ST. JOHN DAY,
 HENRY D. BLAKESLEE.